(12) United States Patent  (10) Patent No.: US 9,154,593 B1
Meldner  (45) Date of Patent: Oct. 6, 2015

(54) FLOTATION AND RELATED INTEGRATIONS TO EXTEND THE USE OF ELECTRONIC SYSTEMS

(71) Applicant: Cubic Tech Corporation, Mesa, AZ (US)

(72) Inventor: Heiner W. Meldner, Mesa, AZ (US)

(73) Assignee: Cubic Tech Corporation, Mesa, AZ (US)

( * ) Notice: Subject to any disclaimer, the term of this patent is extended or adjusted under 35 U.S.C. 154(b) by 121 days.

(21) Appl. No.: 13/922,128

(22) Filed: Jun. 19, 2013

Related U.S. Application Data

(60) Provisional application No. 61/699,212, filed on Sep. 10, 2012, provisional application No. 61/662,047, filed on Jun. 20, 2012.

(51) Int. Cl.
  *H04M 1/02* (2006.01)

(52) U.S. Cl.
  CPC ...................................... *H04M 1/026* (2013.01)

(58) Field of Classification Search
  CPC .............................. F03B 13/264; F03B 17/061
  See application file for complete search history.

(56) References Cited

U.S. PATENT DOCUMENTS

| | | |
|---|---|---|
| 3,644,165 A | 2/1972 | Chen |
| 4,565,714 A | 1/1986 | Koshar |
| 4,588,538 A | 5/1986 | Chung et al. |
| 4,679,519 A | 7/1987 | Linville |
| 4,708,080 A | 11/1987 | Conrad |
| 4,757,742 A | 7/1988 | Mazelsky |
| 4,762,751 A | 8/1988 | Girgis et al. |
| 5,001,003 A | 3/1991 | Mahr |
| 5,094,883 A | 3/1992 | Muzzy et al. |
| 5,333,568 A | 8/1994 | Meldner et al. |
| 5,470,632 A | 11/1995 | Meldner et al. |
| 5,591,933 A | 1/1997 | Li et al. |
| 5,922,161 A | 7/1999 | Wu et al. |
| 6,071,834 A | 6/2000 | Martz |
| 6,224,951 B1 | 5/2001 | Centanni et al. |
| 6,761,795 B2 | 7/2004 | Chapuis et al. |
| 6,846,548 B2 | 1/2005 | Harpell et al. |
| 7,601,416 B2 | 10/2009 | Palley |

(Continued)

FOREIGN PATENT DOCUMENTS

| | | |
|---|---|---|
| CN | 101723067 A | 6/2010 |
| DE | 4010086 A1 | 11/1990 |

(Continued)

OTHER PUBLICATIONS

USPTO; Non-Final Office Action dated Sep. 10, 2013 in U.S. Appl. No. 13/168,912.

(Continued)

*Primary Examiner* — Bobbak Safaipour
(74) *Attorney, Agent, or Firm* — Snell & Wilmer L.L.P.

(57) ABSTRACT

A system related to enabling the in-service capabilities of mobile electronic devices in certain challenging environments. The present system enables recovery of mobile communication device dropped in water of a depth preventing any radio frequency transmission and making recovery of the device difficult. Preferred embodiments of the system contain a deployable flotation feature enabling an emergency, SOS/MAYDAY-signal transmission indicating GPS position via satellite link and/or cellular network in addition to strobe activation.

20 Claims, 6 Drawing Sheets

(56) References Cited

U.S. PATENT DOCUMENTS

| | | | |
|---|---|---|---|
| 7,985,463 | B2 | 7/2011 | Stowell et al. |
| 8,080,487 | B2 | 12/2011 | Gardner et al. |
| 8,256,019 | B2 | 9/2012 | Ardiff et al. |
| 8,343,574 | B2 | 1/2013 | Downs et al. |
| 8,784,968 | B2 | 7/2014 | Adams et al. |
| 8,802,189 | B1 | 8/2014 | Downs et al. |
| 2004/0084138 | A1 | 5/2004 | Henke et al. |
| 2004/0102125 | A1 | 5/2004 | Morman et al. |
| 2005/0112968 | A1 | 5/2005 | Panse |
| 2006/0191427 | A1 | 8/2006 | Geddes et al. |
| 2008/0081171 | A1 | 4/2008 | DuPont |
| 2008/0116043 | A1 | 5/2008 | Chahal et al. |
| 2008/0230173 | A1 | 9/2008 | Cho et al. |
| 2009/0169835 | A1 | 7/2009 | Stowell et al. |
| 2010/0028593 | A1 | 2/2010 | Taketa et al. |
| 2010/0168704 | A1 | 7/2010 | Thomas et al. |
| 2010/0304072 | A1 | 12/2010 | Alvelind |
| 2011/0312238 | A1 | 12/2011 | Bader et al. |
| 2012/0100334 | A1 | 4/2012 | Adams et al. |
| 2012/0118615 | A1 | 5/2012 | Lee et al. |
| 2012/0174753 | A1 | 7/2012 | Wagner et al. |
| 2012/0270454 | A1 | 10/2012 | Chiou |
| 2012/0276380 | A1 | 11/2012 | Traser et al. |
| 2013/0126533 | A1* | 5/2013 | Klosky .......................... 220/560 |
| 2014/0087616 | A1 | 3/2014 | Adams et al. |
| 2014/0134378 | A1 | 5/2014 | Downs et al. |
| 2014/0308510 | A1 | 10/2014 | Downs et al. |

FOREIGN PATENT DOCUMENTS

| | | | |
|---|---|---|---|
| DE | 202011004434 | U1 | 6/2011 |
| EP | 0361796 | A2 | 4/1990 |
| EP | 0579047 | A1 | 1/1994 |
| EP | 0699877 | A2 | 3/1996 |
| GB | 2051674 | A | 1/1981 |
| WO | 8809630 | A1 | 12/1988 |
| WO | 9411185 | A1 | 5/1994 |
| WO | 0002427 | A1 | 1/2000 |
| WO | 0128196 | A1 | 4/2001 |
| WO | 0247899 | | 6/2002 |
| WO | 03005684 | A1 | 1/2003 |
| WO | 2007122009 | | 11/2007 |
| WO | 2009059402 | | 5/2009 |
| WO | 2011163643 | A1 | 12/2011 |
| WO | 2012017233 | A1 | 2/2012 |
| WO | 2012018959 | A1 | 2/2012 |
| WO | 2012150169 | | 11/2012 |
| WO | 2014044688 | | 3/2014 |
| WO | 2014047227 | A1 | 3/2014 |
| WO | 2014047663 | A1 | 3/2014 |
| WO | 2014074966 | A1 | 7/2014 |
| WO | 2014160483 | | 10/2014 |
| WO | 2014160492 | | 10/2014 |
| WO | 2014160498 | | 10/2014 |
| WO | 2014160506 | | 10/2014 |

OTHER PUBLICATIONS

USPTO; Notice of Allowance dated Mar. 21, 2014 in U.S. Appl. No. 13/168,912.
USPTO; Non-Final Office Action dated Mar. 21, 2012 in U.S. Appl. No. 13/197,741.
USPTO; Notice of Allowance dated Oct. 4, 2012 in U.S. Appl. No. 13/197,741.
USPTO; Office Action dated Jul. 17, 2013 in U.S. Appl. No. 13/727,919.
USPTO; Office Action dated Dec. 20, 2013 in U.S. Appl. No. 13/727,919.
USPTO; Advisory Action dated Jan. 28, 2014 in U.S. Appl. No. 13/727,919.
USPTO; Notice of Allowance dated Apr. 11, 2014 in U.S. Appl. No. 13/727,919.
PCT; International Search Report dated Feb. 10, 1994 in Application No. PCT/US1993/011425.
PCT; International Search Report dated Oct. 31, 2011 in Application No. PCT/US2011/041914.
PCT; Written Opinion of the International Search Authority dated Oct. 31, 2011 in Application No. PCT/US2011/041914.
PCT; International Preliminary Report on Patentability dated May 17, 2012 in Application No. PCT/US2011/041914.
PCT; International Search Report dated Dec. 16, 2011 in Application No. PCT/US2011/046497.
PCT; Written Opinion of the Intenational Searching Authority dated Dec. 16, 2011 in Application No. PCT/US2011/046497.
PCT; International Preliminary Report on Patentability dated Aug. 2, 2012 in Application No. PCT/US2011/046497.
PCT; International Search Report and Written Opinion dated Feb. 21, 2014 in Application No. PCT/US2013/061509.
PCT; International Search Report and Written Opinion dated Feb. 28, 2014 in Application No. PCT/US2013/060487.
PCT; International Search Report and Written Opinion dated May 7, 2014 in Application No. PCT/US2013/069364.
EPO; Supplementary European Search Report dated Jul. 27, 1995 in Application No. EP 94902379.
EPO; Office Action dated Apr. 4, 1997 in Application No. EP 94902379.
EPO; Office Action dated Jul. 22, 1998 in Application No. EP 94902379.
EPO; Office Action dated Jun. 17, 1999 in Application No. EP 94902379.
EPO; Office Action dated Aug. 17, 2000 in Application No. EP 94902379.
CPO; Office Action dated Apr. 2, 2014 in Application No. CN 201180037975.6.
CPO; Office Action dated Jun. 6, 2014 in Application No. CN 201180031205.0.
USPTO; Restriction Requirement dated Aug. 25, 2014 in U.S. Appl. No. 14/076,201.
PCT; International Search Report and Written Opinion dated Aug. 14, 2014 in Application No. PCT/US2014/026796.
PCT; International Search Report and Written Opinion dated Aug. 11, 2014 in Application No. PCT/US2014/026828.
PCT; International Search Report and Written Opinion dated Aug. 20, 2014 in Application No. PCT/US2014/026856.
CPO; Office Action dated Oct. 8, 2014 in Application No. CN 201180031205.0.
USPTO; Restriction Requirement dated Feb. 9, 2015 in U.S. Appl. No. 14/031,040.
USPTO; Non-Final Office Action dated Nov. 19, 2014 in U.S. Appl. No. 14/326,261.
USPTO; Notice of Allowance dated Mar. 10, 2015 in U.S. Appl. No. 14/326,261.
PCT; International Search Report and Written Opinion dated Dec. 11, 2014 in Application No. PCT/US2014/026870.
EPO; European Search Report dated Jan. 7, 2015 in Application No. EP 11799030.9.
CPO; Office Action dated Nov. 15, 2014 in Application No. CN 201180037975.6.
U.S. Appl. No. 13/168,912, filed Jun. 24, 2011, Waterproof Breathable Composite Materials for Fabrication of Flexible Membranes and Other Articles.
U.S. Appl. No. 14/309,578, filed Jun. 19, 2014, Waterproof Breathable Composite Materials for Fabrication of Flexible Membranes and Other Articles.
U.S. Appl. No. 14/031,040, filed Sep. 18, 2013, Flexible Composite Systems.
U.S. Appl. No. 14/076,201, filed Nov. 9, 2013, Systems and Method for Producing Three-Dimensional Articles From Flexible Composite Materials.
U.S. Appl. No. 13/727,919, filed Dec. 27, 2012, System and Method for the Transfer of Color and Other Physical Properties to Laminate Composite Materials and Other Articles.
U.S. Appl. No. 14/326,261, filed Jul. 8, 2014, System and Method for the Transfer of Color and Other Physical Properties to Laminate Composite Materials and Other Articles.
U.S. Appl. No. 14/207,790, filed Mar. 13, 2014, Engineered Composite Systems.

(56) References Cited

OTHER PUBLICATIONS

U.S. Appl. No. 14/208,017, filed Mar. 13, 2014, Light-Weight Semi-Rigid Composite Anti-Ballistic Systems With Engineered Compliance and Rate-Sensitive Impact Response.

U.S. Appl. No. 14/207,891, filed Mar. 13, 2014, Flexible Composite Systems.

U.S. Appl. No. 14/208,107, filed Mar. 13, 2014, Flexible Electronic Fiber-Reinforced Composite Materials.

* cited by examiner

FLOTATION AND RELATED INTEGRATIONS TO EXTEND THE USE OF ELECTRONIC SYSTEMS

The present application is related to and claims priority from prior provisional application Ser. No. 61/662,047, filed Jun. 20, 2012, entitled "ELECTRONIC FLOTATION SYSTEMS"; and, this application is related to and claims priority from prior provisional application Ser. No. 61/699,212, filed Sep. 10, 2012, entitled "FLOTATION AND RELATED INTEGRATIONS TO EXTEND THE USE OF ELECTRONIC SYSTEMS", the contents of all of which are incorporated herein by this reference and are not admitted to be prior art with respect to the present invention by the mention in this cross-reference section.

BACKGROUND

This invention relates to providing a system enhancing the functionality and durability of mobile electronic communication devices. More particularly, this invention relates to providing a system of recovery-assistance features to enhance the in-service capabilities of mobile electronic devices in certain challenging environments.

Advances in mobile-communication devices have provided individuals with unprecedented levels of communication capabilities. Many individuals around the world now routinely carry mobile phones and the daily use of internet-enabled "smart phones" is becoming increasingly popular.

Although personal mobile-phone technology now permits many individuals to enjoy on-demand communication capabilities, in many remote regions of the world, conventional mobile-communication access is sporadic or non-existent. The above limitation negates the usefulness of these devices in environments where the risks associated with remote travel could otherwise be mitigated by the operation of such devices. For many open-water boaters/fishermen, remote hikers, field personnel, etc., this represents a significant and undesirable assumption of risk.

Furthermore, in the interest of producing small highly-compact packaging, most mobile communication devices are of a density significantly greater than water, and thus sink. Although many current devices are relatively water-resistant, the inability to recover a device dropped in moderate to deep waters is a factor of additional concern to boaters, fishermen, and other personnel operating on or near water.

OBJECTS AND FEATURES OF THE INVENTION

A primary object and feature of the present invention is to provide a system overcoming the above-mentioned problem(s).

It is a further object and feature of the present invention to provide such a system comprising improvements in the compact integration of multi-functional, single-unit electronic devices. It is a further object and feature of the present invention to provide such a system enabling recovery of mobile communication devices dropped in waters of a depth making recovery of the device difficult. It is another object and feature of the present invention to provide such a system comprising a hand-held mobile communication device containing a flotation feature combined with an emergency position-indicating radio beacon, which may be activated manually or automatically when a specific set of conditions is met. It is a further object and feature of the present invention to provide such a system comprising a flotation feature and beacon combined with a satellite communicator module.

It is another object and feature of the present invention to provide such a system integrated into an attachable outer case or outer shell. It is a further object and feature of the present invention to provide such a system alternately integrated within mobile communication device.

A further primary object and feature of the present invention is to provide such a system that is efficient, inexpensive, and useful. Other objects and features of this invention will become apparent with reference to the following descriptions.

SUMMARY OF THE INVENTION

A system, relating to implementing one or more recovery-assistance features within at least one mobile communicator, such system comprising: at least one buoyancy modifier configured to modify the effective buoyancy of the at least one mobile communicator; at least one integrator configured to integrate such at least one buoyancy modifier with the at least one mobile communicator; wherein such at least one buoyancy modifier comprises at least one stowed configuration comprising at least one first buoyancy state, and at least one deployed configuration comprising at least one second buoyancy state; wherein such at least one buoyancy modifier is configured to be compactly stowable adjacent the at least one mobile communicator when such at least one buoyancy modifier comprises such at least one first buoyancy state; wherein such at least one buoyancy modifier is configured to impart to the at least one mobile communicator an effective density less than that of at least one aqueous liquid when such at least one buoyancy modifier is integrated with the at least one mobile communicator and such at least one buoyancy modifier comprises such at least one second buoyancy state; and wherein such at least one buoyancy modifier comprises at least one automatic buoyancy-modification initiator configured to automatically initiate transition of such at least one first buoyancy state to such at least one second buoyancy state when at least one pre-defined condition is met.

Moreover, it provides such a system wherein such at least one buoyancy modifier further comprises: at least one gas-inflatable bladder configured to contain at least one inflation gas; operably coupled with such at least one gas-inflatable bladder, at least one gas provider configured to provide the at least one inflation gas to such at least one gas-inflatable bladder; and wherein such at least one automatic buoyancy-modification initiator comprises at least one inflation initiator configured to initiate the providing of the at least one inflation gas to such at least one gas-inflatable bladder when such at least one pre-defined condition is met. Additionally, it provides such a system wherein such at least one second buoyancy state correlates with at least one increased displacement volume of such at least one gas-inflatable bladder when inflated with the at least one inflation gas. Also, it provides such a system wherein such at least one first buoyancy state correlates with at least one decreased displacement volume of such at least one gas-inflatable bladder prior to inflation.

In addition, it provides such a system wherein such at least one gas provider comprises: at least one first reactant and at least one second reactant configured to produce the at least one inflation gas when combined; at least one reactor configured to react such at least one first reactant and such at least one second reactant; and at least one gas-communicative pathway linking such at least one reactor with such at least one gas-inflatable bladder; wherein production of at least one inflation gas by such at least one reactor is controlled by such at least one inflation initiator; and wherein such at least one reactor comprises at least one reactant separator structured and arranged to separate such at least one first reactant and such at least one second reactant until such production of the at least one inflation gas is required. And, it provides such a system wherein such at least one gas provider comprises: at least one gas-storage container configured to store the at least one inflation gas at a pressure greater than that of the surrounding atmosphere; at and at least one gas-communicative pathway linking such at least one reactor with such at least one gas-inflatable bladder; and at least one valve configured to control the passage of the at least one inflation gas between such at least one gas-storage container and such at least one gas-inflatable bladder; wherein operation of such at least one valve is controlled by such at least one inflation initiator.

Further, it provides such a system further comprising: at least one sensor configured to sense the presence of at least one environmental factor associated with such at least one pre-defined condition; wherein such at least one automatic buoyancy-modification initiator is configured to receive sensor data from such at least one sensor. Even further, it provides such a system wherein such at least one sensor comprises at least one liquid sensor configured to sense the presence of the at least one aqueous liquid adjacent the at least one mobile communicator. Moreover, it provides such a system wherein such at least one sensor comprises at least one pressure sensor configured to sense atmospheric pressure adjacent the at least one mobile communicator.

Additionally, it provides such a system wherein such at least one automatic buoyancy-modification initiator is configured to automatically initiate such transition to such at least one second buoyancy state when such at least one pre-defined condition comprises an increase in ambient pressure of about 1.5 pounds per square inch. Also, it provides such a system wherein such at least one sensor comprises at least one liquid sensor configured to sense the presence of the at least one aqueous liquid adjacent the at least one mobile communicator. In addition, it provides such a system wherein such least one sensor comprises at least one acceleration sensor configured to sense acceleration loading experienced by the at least one mobile communicator. And, it provides such a system wherein such at least one automatic buoyancy-modification initiator is configured to automatically initiate such transition to such at least one second buoyancy state when such at least one pre-defined condition comprises a detected acceleration load of at least about five gravities. Further, it provides such a system wherein each such at least one gas-inflatable bladder displaces a volume of at least about six cubic inches when inflated.

Even further, it provides such a system further comprising at least one illuminator configured to provide illumination assisting location and retrieval of the at least one mobile communicator. Moreover, it provides such a system further comprising at least one emergency position-indicating radio beacon configured to transmit at least one emergency radio-frequency signal detectable by at least one search-and-rescue asset. Additionally, it provides such a system wherein such least one emergency position-indicating radio beacon is structured and arranged to transmit at least one emergency radio-frequency signal detectable by at least one earth-orbiting satellite. Also, it provides such a system wherein such least one emergency position-indicating radio beacon comprises at least one onboard Global Positioning System (GPS) receiver.

In addition, it provides such a system wherein such at least one integrator further comprises: at least one docking connector configured to operably couple to at least one docking port of the at least one mobile communicator; wherein such operable coupling enables interoperation between the at least one mobile communicator and one or more features of such system. And, it provides such a system wherein such system is structured and arranged to utilize at least one human interface feature of the at least one mobile communicator. Further, it provides such a system wherein such at least one docking connector is configured to interface with and receive signal data from at least one internal GPS receiver of the at least one mobile communicator.

Even further, it provides such a system further comprising at least one short-message-service (SMS) transmitter configured to transmit SMS-based communications. Moreover, it provides such a system further comprising at least one short-message-service (SMS) transmitter/receiver configured to transmit and receive SMS-based communications. Additionally, it provides such a system wherein such at least one integrator comprises: at least one outer housing configured to at partially house the at least one mobile communicator; wherein such at least one outer housing is removably attachable to the at least one mobile communicator. Also, it provides such a system at least one integrator comprises at least one portion of the at least one mobile communicator.

In accordance with another preferred embodiment hereof, this invention provides a system, relating to implementing one or more recovery-assistance features within at least one mobile communicator, such system comprising: at least one buoyancy modifier, comprising at least one gas-inflatable bladder, configured to modify the effective buoyancy of the at least one mobile communicator; at least one integrator configured to integrate such at least one buoyancy modifier with the at least one mobile communicator; wherein such at least one gas-inflatable bladder comprises at least one stowed configuration comprising at least one first buoyancy state, and at least one deployed configuration comprising at least one second buoyancy state; wherein such at least one gas-inflatable bladder is configured to be compactly stowable adjacent the at least one mobile communicator when such at least one gas-inflatable bladder comprises such at least one first buoyancy state; wherein such at least one gas-inflatable bladder is configured to impart to the at least one mobile communicator an effective density less than that of at least one aqueous liquid when such at least one gas-inflatable bladder is integrated with the at least one mobile communicator and such at least one gas-inflatable bladder comprises such at least one second buoyancy state; wherein such at least one buoyancy modifier comprises at least one automatic buoyancy-modification initiator configured to automatically initiate transition of such at least one gas-inflatable bladder from such at least one first buoyancy state to such at least one second buoyancy state when at least one pre-defined condition is met; wherein such at least one buoyancy modifier further comprises, operably coupled with such at least one gas-inflatable bladder, at least one gas provider configured to provide the at least one inflation gas to such at least one gas-inflatable bladder; and wherein such at least one automatic buoyancy-modification initiator comprises at least one sensor configured to sense the presence of at least one environmental factor associated with such at least one pre-defined condition, and at least one inflation initiator configured to initiate the providing of the at least one inflation gas to such at least one gas-inflatable bladder when such at least one pre-defined condition is met.

In addition, it provides such a system further comprising at least one emergency position-indicating radio beacon configured to transmit at least one emergency radio-frequency signal detectable by at least one search-and-rescue asset. And, it provides such a system wherein such least one emergency position-indicating radio beacon is structured and arranged to transmit at least one emergency radio-frequency signal detectable by at least one earth-orbiting satellite. Further, it provides such a system wherein such least one emergency position-indicating radio beacon comprises at least one onboard Global Positioning System (GPS) receiver. Even further, it provides such a system wherein such at least one integrator further comprises: at least one docking connector configured to operably couple to at least one docking port of the at least one mobile communicator; wherein such operable coupling enables interoperation between the at least one mobile communicator and one or more features of such system. Moreover, it provides such a system wherein such system is structured and arranged to utilize at least one human interface feature of the at least one mobile communicator. Additionally, it provides such a system further comprising at least one short-message-service (SMS) communicator configured to enable SMS-based communications. Also, it provides such a system wherein such at least one integrator comprises: at least one outer housing configured to at least partially house the at least one mobile communicator; wherein such at least one outer housing is removably attachable to the at least one mobile communicator. In addition, it provides such a system at least one integrator comprises at least one portion of the at least one mobile communicator.

In accordance with another preferred embodiment hereof, this invention provides a system, relating to implementing one or more recovery-assistance features within at least one mobile communicator, such system comprising: buoyancy modifying means for modifying the effective buoyancy of the at least one mobile communicator; integrating means for integrating such buoyancy modifying means with the at least one mobile communicator; wherein such buoyancy modifying means comprises at least one stowed configuration comprising at least one first buoyancy state, and at least one deployed configuration comprising at least one second buoyancy state; wherein such buoyancy modifying means is configured to impart, to the at least one mobile communicator, an effective density less than that of at least one aqueous liquid when such buoyancy modifying means is integrated with the at least one mobile communicator and such buoyancy modifying means comprises such at least one second buoyancy state; and wherein such buoyancy modifying means comprises automatic buoyancy-modification initiating means for initiating transition of such buoyancy modifying means form such at least one first buoyancy state to such at least one second buoyancy state when at least one pre-defined condition is met. And, it provides such a system further comprising illuminating means for providing illumination assisting location and retrieval of the at least one mobile communicator. Further, it provides such a system further comprising at least one radio-signal transmitting means for transmitting at least one emergency radio-frequency signal detectable by at least one search-and-rescue satellite.

Even further, it provides such a system further comprising at least one radio-signal receiver means for receiving at least one emergency radio-frequency signal from at least one search-and-rescue satellite. Even further, it provides such a system further comprising Global Positioning System (GPS) data generating means for generating GPS data. In accordance with these and other preferred embodiments hereof, this invention provides each and every novel feature, element, combination, step and/or method disclosed or suggested by this patent application.

DETAILED DESCRIPTION OF THE BEST MODES AND PREFERRED EMBODIMENTS OF THE INVENTION

Figure 1:
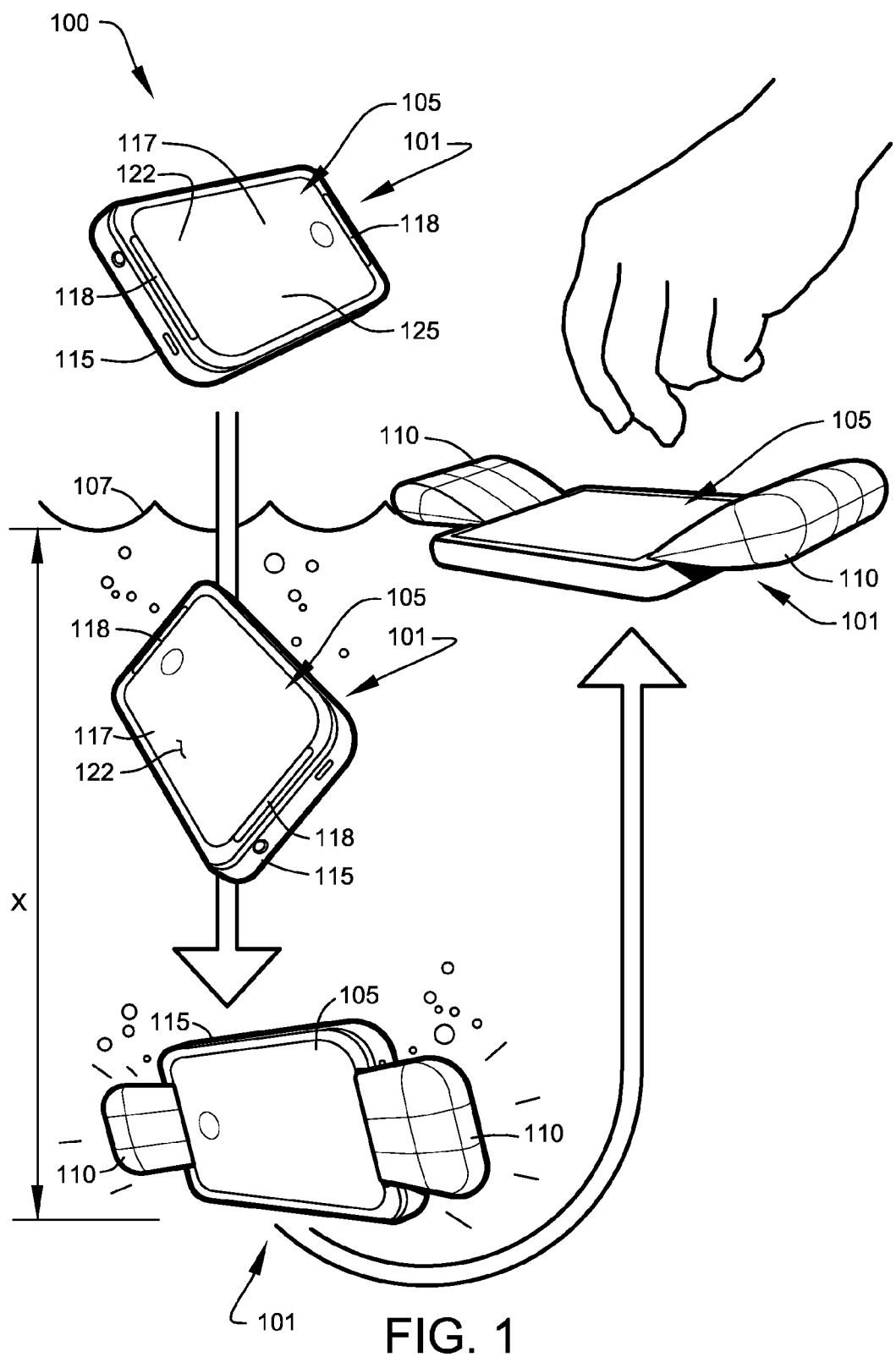
FIG. 1 shows a perspective view of a phone recovery device of phone recovery and rescue systems engaged with a mobile communication device, according to a preferred embodiment of the present invention.

FIG. 1 shows a perspective view of phone-recovery device 101 of phone recovery and rescue system 100 engaged with at least one mobile communication device 105, according to a preferred embodiment of the present invention. Phone-recovery device 101 preferably comprises one or more recovery-assistance features, which may be activated automatically or manually when a specific set of conditions is met.

Mobile communication device 105 preferably comprises at least one mobile phone, preferably at least one "smart phone" or similar cell-phone device having one or more onboard computer processors (CPUs) to run communication data processing and interface with build-in devices such as GPS receivers, camcorders, etc. As a preferred non-limiting example of preferred embodiments of the present system, phone-recovery device 101 preferably is adapted to operate with at least an iPhone® brand mobile device produced by Apple Corp. of Cupertino, Calif. Upon reading this specification, those with ordinary skill in the art will now appreciate that, under appropriate circumstances, considering such issues as design preference, user preferences, marketing preferences, cost, structural requirements, available materials, technological advances, etc., other communication devices such as, for example, portable computer devices, other portable wireless devices, other brands makes or models of portable phones, etc., may suffice.

Phone-recovery device 101 preferably is structured and arranged to assist retrieval of mobile communication device 105 after mobile communication device 105 is dropped or immersed into water 107, as shown. One highly preferred feature of phone-recovery device 101 is the ability of the system to modify the overall buoyancy of a mobile communication device 105 to which it is attached. More specifically, phone-recovery device 101 preferably comprises at least one buoyancy modifier in the form of at least one pop-out flotation bladder 110, preferably two gas-inflatable pop-out flotation bladders 110, as shown (at least embodying herein buoyancy modifying means and at least embodying herein at least one gas-inflatable bladder configured to contain at least one inflation gas). Pop-out flotation bladders 110 preferably function to modify the overall buoyancy of the system by increasing the volume of liquid potentially displaced by the system (at least embodying herein at least one buoyancy modifier configured to modify the effective buoyancy of the at least one mobile communicator). Phone-recovery device 101 preferably is structured and arranged to initiate deployment and inflation of pop-out inflatable bladders 110 automatically when at least one pre-defined condition is met (at least embodying herein wherein such at least one buoyancy modifier comprises at least one automatic buoyancy-modification initiator configured to automatically initiate transition of such at least one first buoyancy state to such at least one second buoyancy state when at least one pre-defined condition is met). In one preferred embodiment of the present system, phone-recovery device 101 is preferably structured and arranged to automatically trigger deployment and inflation of pop-out inflatable bladders 110 upon submersion of mobile communication device 105 in an aqueous liquid, for example, submersion in liquid water, as shown. Phone-recovery device 101 preferably triggers deployment and inflation of pop-out flotation bladders 110 upon sensing either the presence of water and/or the presence of water and a pre-determined increase in external pressure that occurs upon submersion of mobile communication device to pre-determined water depth X (see further details below). Pre-determined water depth X preferably is about one meter below the water surface. Accordingly, phone-recovery device 101 preferably is structured and arranged to automatically trigger deployment and inflation of pop-out flotation bladders 110 upon detection of the water and an increase change in external pressure of about 1.5 psi, for example, from about 14.7 psi (approximate pressure at sea level) to about 16.2 psi (approximate external pressure about one meter below the water surface). Upon reading this specification, those with ordinary skill in the art will now appreciate that, under appropriate circumstances, considering such issues as design preference, user preferences, cost, phone requirements, technological advances, etc., other trigger conditions such as, for example, other submersion depths, other pressure differentials, etc., may suffice.

Alternately preferably, preferred embodiments of phone-recovery device 101 are configured to react when the apparatus experiences force loads associated with an impact. In this alternate preferred configuration, one or more recovery features of the system are activated on detection of a rapid deceleration load exceeding a preset value. Preferably, such a preferred embodiment comprises one or more accelerometer-type sensors. Preferably, the acceleration detection and control subsystems may be calibrated to trigger at various preset levels. One preferred calibration is the triggering of recovery features on detection of shock loads equaling or exceeding about 5G. It should be noted that compactness (small size and weight) is an important criteria in the design and implementation of the preferred embodiments of the present system. To address compact packaging requirements, the use of capacitance-type micro-electro-mechanical (MEMS) accelerometer sensors is preferred. Alternately preferably, preferred embodiments of phone-recovery device 101 are configured to interface with and receive signal data from the existing internal accelerometer sensor(s) embedded within mobile communication device 105.

When pop-out inflation bladders 110 are deployed, the combined displacement volume of mobile communication device 105 and phone-recovery device 101 is substantially increased. The resulting increase in displacement volume preferably modifies the mass-volume ratio of the apparatus to comprise an effective density less than that of the surrounding water, thereby causing mobile communication device 105 to float to the water surface, as shown in FIG. 1 (at least embodying herein wherein such at least one buoyancy modifier is configured to impart to the at least one mobile communicator an effective density less than that of at least one aqueous liquid when such at least one buoyancy modifier is integrated with the at least one mobile communicator and such at least one buoyancy modifier comprises such at least one second buoyancy state). A user preferably may then retrieve mobile communication device 105, as shown.

One preferred implementation of phone-recovery device 101 utilizes a specialized outer case 115 as a means for integrating the features of the system within mobile communication device 105, as shown. Outer case 115 (at least embodying herein at least one integrator configured to integrate such at least one buoyancy modifier with the at least one mobile communicator and at least embodying herein integrating means for integrating such buoyancy modifying means with the at least one mobile communicator) preferably is structured and arranged to removably contain mobile communication device 105, as shown. Outer case 115 is preferably configured to accommodate and maintain the continued operation and accessibility of essential user-interface features of mobile communication device 105. For example, outer case 115 preferably comprises at least one touch-interface access region 122, as shown. Touch-interface access region 122 preferably provides for user viewing and touch access to touch screen 125 of mobile communication device 105, as shown in FIG. 1. Upon reading this specification, those with ordinary skill in the art will now appreciate that, under appropriate circumstances, considering such issues as design preference, user preferences, marketing preferences, cost, structural requirements, available materials, technological advances, etc., other arrangement such as plastic coverings that allow user access to touch screen, openings allowing access to number/letter dials, operable buttons, speaker/microphone ports, camera lenses, I/O ports, etc., may suffice.

Outer case 115 preferably comprises at least one lightweight and water proof material, preferably one or more durable polymers. Upon reading this specification, those with ordinary skill in the art will now appreciate that, under appropriate circumstances, considering such issues as design preference, user preferences, marketing preferences, cost, structural requirements, available materials, technological advances, etc., other materials such as, for example, metallic materials, composites, etc., may suffice.

Outer case 115 preferably further comprises at least one bladder-storage component 118, preferably two bladder-storage components 118, as shown. Bladder-storage components 118 preferably are structured and arranged to contain pop-out flotation bladders 110 in at least one folded/compressed and retracted position. Pop-out flotation bladders 110 preferably deploy outwardly from bladder-storage components 118 once phone-recovery device 101 detects that the requisite "trigger event" has occurred. In the preferred example embodiment depicted in FIG. 1, the trigger event occurs when phone-recovery device 101 reaches pre-determined water depth X, as shown. Pop-out flotation bladders 110 preferably deploy outwardly from their respective bladder-storage components 118 by implementation of at least one inflation process. At first, pop-out flotation bladders 110 comprise an initial low-buoyancy state (at least embodying herein wherein such at least one buoyancy modifier comprises at least one stowed configuration comprising at least one first buoyancy state). In this initial "compactly stowed" configuration (prior to inflation) the system does not significantly contribute to the overall physical size or buoyancy of the apparatus (at least embodying herein wherein such at least one buoyancy modifier is configured to be compactly stowable adjacent the at least one mobile communicator when such at least one buoyancy modifier comprises such at least one first buoyancy state). It again noted that compactness (small size and weight) is important in the design and implementation of the preferred embodiments of the present system. With this preferred criterion in mind, it is preferred that pop-out flotation bladders 110 be constructed and configured to achieve compact pre-deployment storage within the device housing. It therefore preferred that pop-out flotation bladders 110 be constructed primarily from thin flexible materials having sufficient mechanical strength to remain intact during deployment and subsequent flotation operation. Furthermore, preferred bladder materials must comprise low water and gas permeability. Materials suitable for the fabrication of pop-out flotation bladders preferably include ultra-thin flexible composites materials comprising an air-impermeable film membrane with fiber reinforcement. Upon reading this specification, those with ordinary skill in the art will now appreciate that, under appropriate circumstances, considering such issues as design preference, user preferences, marketing preferences, cost, structural requirements, available materials, technological advances, etc., other material arrangements such as, for example, Mylar films, woven or non-woven materials, coated uncoated materials, etc., may suffice.

Pop-out flotation bladders 110 preferably are brightly colored in order to preferably promote visibility and preferably assist location of mobile communication device 110 in the water. Preferred colors for pop-out flotation bladders 110 preferably comprise one or more high-chroma colors, preferably orange, alternately preferably red, and alternately preferably yellow. Upon reading this specification, those with ordinary skill in the art will now appreciate that, under appropriate circumstances, considering such issues as design preference, user preferences, environment of use, cost, available materials, technological advances, etc., other materials, such as fluorescent materials, phosphorescent materials, etc., may suffice. Furthermore, upon reading this specification, those with ordinary skill in the art will now appreciate that, under appropriate circumstances, considering such issues as intended use, user preferences, marketing preferences, available materials, technological advances, etc., other color arrangements such as, for example, green, fluorescent colors, etc., may suffice.

Pop-out flotation bladders 110 preferably each expand to a volume of about six cubic inches when inflated. The size of pop-out flotation bladders 110, when inflated, preferably displaces a volume of water sufficient to produce positive buoyancy in addition to enhancing visibility to assist location of mobile communication device 105 in the water. Upon reading this specification, those with ordinary skill in the art will now appreciate that, under appropriate circumstances, considering such issues as design preference, phone mass, structural requirements, available materials, density of aqueous solution, etc., other expansion volumes may suffice.

Figure 2:
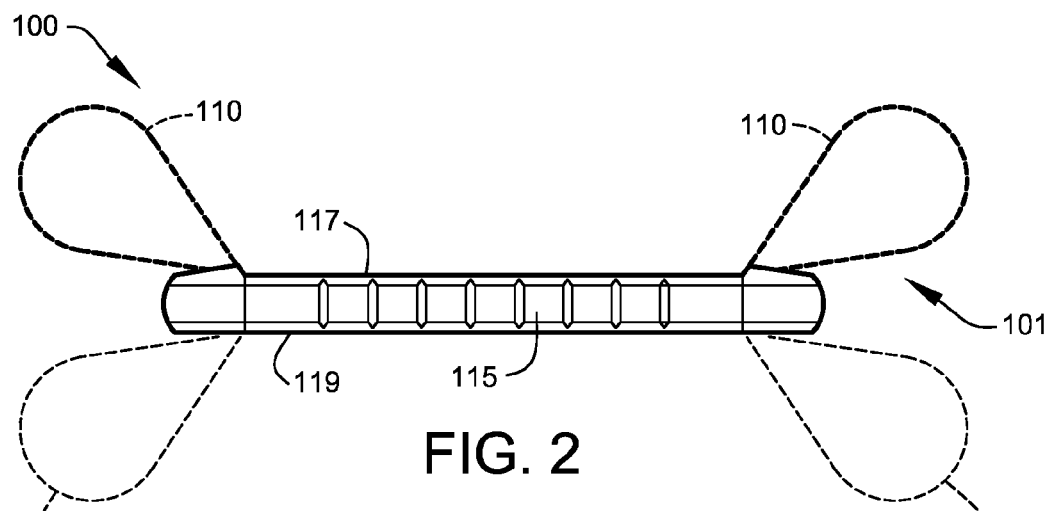
FIG. 2 shows a side view, illustrating a phone recovery device with pop-out flotation bladders inflated, according to the preferred embodiment of FIG. 1.

FIG. 2 shows a side view, illustrating phone-recovery device 101 with preferred locations of inflated pop-out flotation bladders 110 indicated by the dashed-line depictions, according to the preferred embodiment of FIG. 1. In the secondary buoyancy state, the pop-out flotation bladders 110 preferably deploy (extend) outwardly from front face 117 of specialized outer case 115, as shown (at least embodying herein wherein such at least one buoyancy modifier comprises at least one deployed configuration comprising at least one second buoyancy state and wherein such at least one second buoyancy state correlates with at least one increased displacement volume of such at least one gas-inflatable bladder when inflated with the at least one inflation gas). Alternately preferably, pop-out flotation bladders 110 deploy outwardly from back face 119 of specialized case, as shown. Alternately preferably, four smaller-volume bladders may be utilized.

Figure 3:
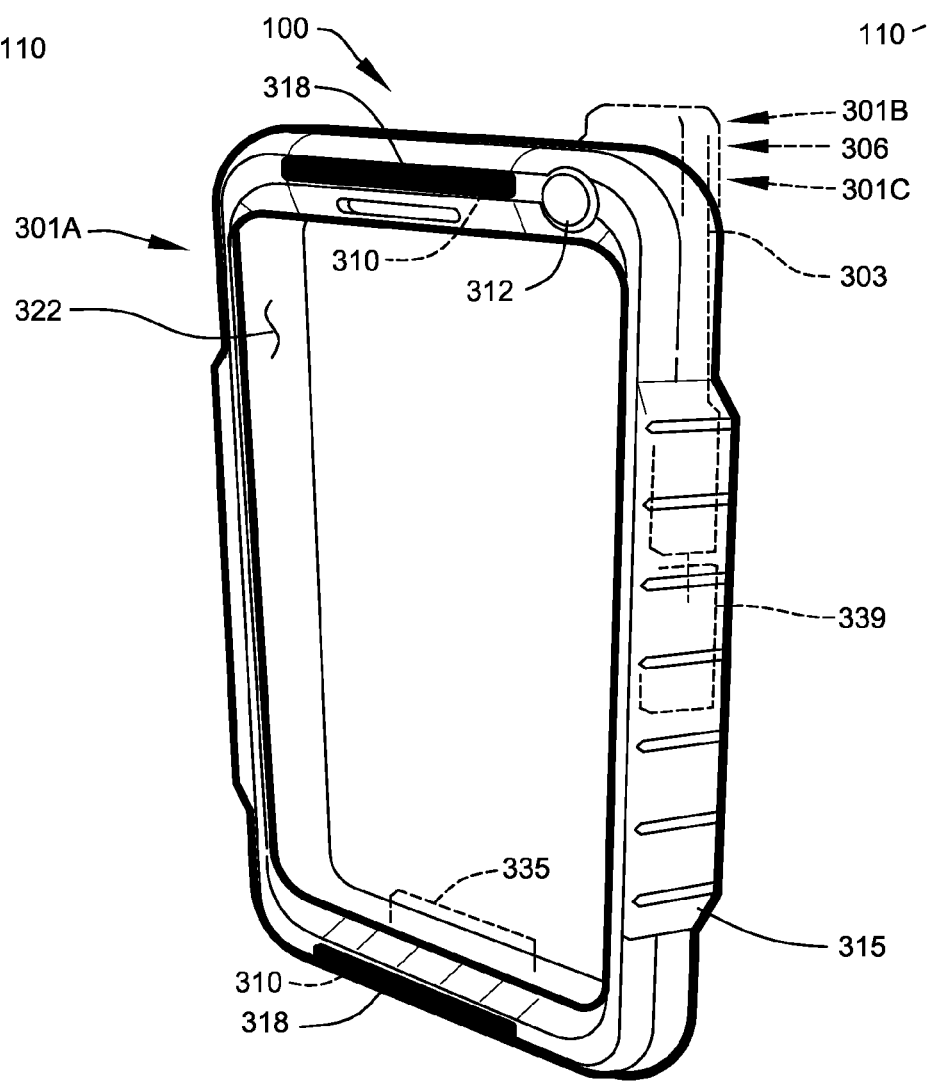
FIG. 3 shows a front perspective view, illustrating a phone retrieval device, according to another preferred embodiment of the present invention.
Figure 9:
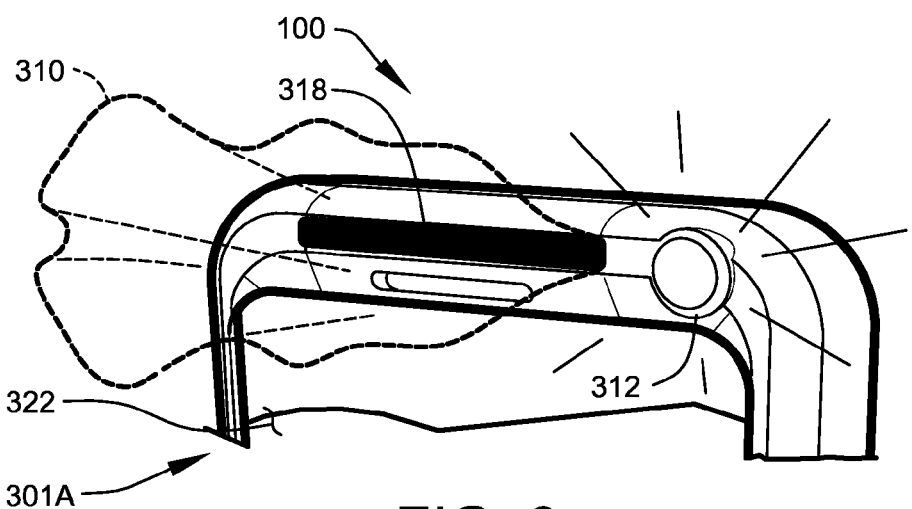
FIG. 9 is a partial perspective view illustrating in further detail preferred features, according to preferred embodiments of the present invention.

FIG. 3 shows a front perspective view, illustrating phone recovery device 301A of phone recovery and rescue systems 100, according to another preferred embodiment of the present invention. While many features of phone recovery device 301A are repeated from phone recovery device 101, phone recovery device 301A preferably comprises the additional visibility enhancements, preferably comprising at least one externally-visible strobe light 312, as best shown in the enlarged view of FIG. 9. Illumination and flashing of strobe light 312 preferably functions to enhance the visibility of the device to promote location and retrieval of mobile communication device 301A, especially at night or under conditions of poor visibility.

Alternate preferred embodiments of the phone recovery device further comprise features configured to provide rescue assistance in addition to the above-described apparatus flotation-recovery features. Preferably, alternate preferred phone recovery device 301B comprises at least one emergency position-indicating radio beacon 306, as shown. Emergency position-indicating radio beacon 306 preferably transmits at least one emergency radio frequency signal that preferably is detectable by at least one Earth-orbiting satellite 330, as shown in FIG. 4.

Figure 4:
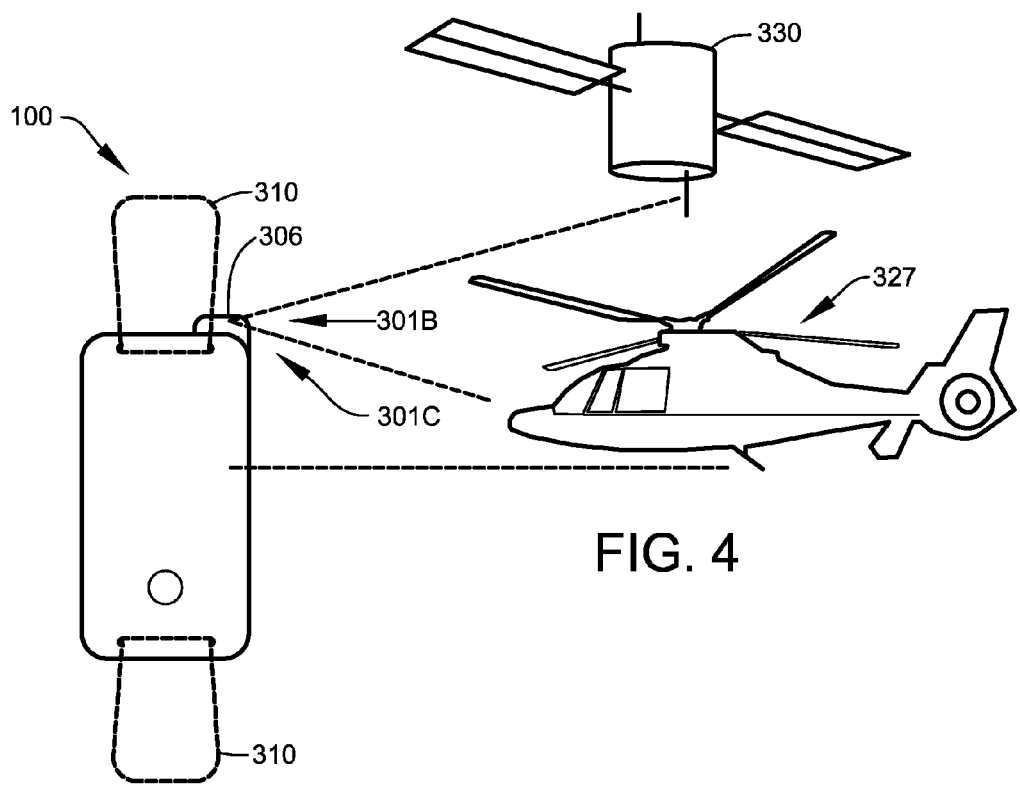
FIG. 4 shows a perspective view, illustrating the phone recovery device in communication with an Earth-orbiting satellite, according to the preferred embodiment of FIG. 3.

FIG. 4 shows a perspective view, diagrammatically illustrating phone recovery device 301B in communication with at least one Earth-orbiting satellite 330, according to the preferred embodiment of FIG. 3. As shown in FIG. 4, phone recovery device 301 preferably transmits at least one radio frequency signal detectable by at least one earth-orbiting satellite 330.

Emergency position-indicating radio beacon 306 preferably is coupled with at least one onboard Global Positioning System (GPS) receiver 339 that preferably enables accurate detection of the location of the activated mobile communication device 105, preferably by conveying the GPS data to satellite 330 and/or rescuers through the transmitted radio signal. It is noted that preferred embodiments of the present system may comprise one or more docking connectors 335 configured to operably connect to a docking port of mobile communication device 105. In this alternate preferred configuration, phone recovery device 301 is configured to interface with and receive signal data from the existing internal GPS receiver embedded within mobile communication device 105.

Accordingly, phone recovery device 301 preferably functions to assist location and retrieval of mobile communication device 105 in the event of its loss in open waters. Preferred embodiments of emergency position-indicating radio beacon 306 preferably broadcast a unique registered distress signal that allows the identification of the specific phone recovery device 301 in addition to the GPS location data. Further, phone recovery device 301 preferably may further function to assist locating a person or persons lost in open waters by tracking the location of any mobile communication device 105 that was carried with them.

Emergency position-indicating radio beacon 306 and strobe light 312 preferably are activated automatically by respective onboard logic (see FIG. 6 through FIG. 8) when phone recovery device 301 reaches pre-determined water depth X (see FIG. 1). Accordingly, phone recovery device 301 preferably comprises an automatic buoyancy-modification initiator comprising at least one inflation initiator configured to initiate inflation of the bladders when the system senses water immersion and the increase in external pressure that occurs when phone recovery device 301 reaches pre-determined water depth X and then preferably triggers activation of emergency position-indicating radio beacon 306 and, if equipped, strobe light 312 (see further details below). Preferred configurations of emergency position-indicating radio beacon 306 and strobe light 312 preferably include a means for manual activation. Alternately preferably, emergency position-indicating radio beacon 306 and strobe light 312 may be activated via interface with the user controls of mobile communication device 105 if mobile communication device 105 and phone recovery device 301 are in electronic communication.

Like phone recovery device 101, phone recovery device 301 preferably comprises pop-out flotation bladders 310, as shown. Moreover, phone recovery device 301 preferably automatically deploys and inflates pop-out flotation bladders 310 upon detecting a trigger event, preferably including the sensing of external pressures associated with submersion to pre-determined water-depth X (see FIG. 1). The above-described at least embodies herein wherein such at least one automatic buoyancy-modification initiator comprises at least one inflation initiator configured to initiate the providing of the at least one inflation gas to such at least one gas-inflatable bladder when such at least one pre-defined condition is met.

Like phone recovery device 101, phone recovery device 301 comprises at least one specialized outer case 315 to contain mobile communication device 105. Phone recovery device 105 preferably further comprises at least one bladder-storage component 318, preferably two bladder-storage components 318, as shown. Each bladder-storage component 318 preferably is structured and arranged to contain pop-out flotation bladders 310 while they are in the folded/compressed and withdrawn positions. Phone recovery device 301 preferably further comprises at least one touch-interface access region 322 to preferably provide user access to the touch screen of mobile communication device 105, as shown.

The exact location of mobile communication device 105 preferably is conveyed to satellite 330 in the radio frequency signal by virtue of the GPS-receiver integrated in emergency position-indicating radio beacon 306. If emergency position-indicating radio beacon 306 is registered with a unique identification number, identification information associated with mobile communication device 105, preferably including the name of the owner(s) of mobile communication device 105, will also be conveyed to satellite 330 in the transmitted radio frequency signal. Preferably, the rescue signal transmits at regular intervals (for example, every 5 minutes) until the system is deactivated or the onboard batteries can no longer supply sufficient operational power. The rescue signal is preferably transmitted from satellite 330 to at least one emergency response center, who preferably alerts the appropriate local search and rescue (SAR) agency.

SAR rescuers preferably may then come to the site of the lost mobile communication device 105 for retrieval. The above-described arrangement preferably may be employed to assist locating persons lost in open waters by detecting the location of any system-modified mobile communication device 105 that was carried with them. Upon reading this specification, those with ordinary skill in the art will now appreciate that, under appropriate circumstances, considering such issues as design preference, user preferences, marketing preferences, cost, structural requirements, available materials, technological advances, etc., other tracking arrangements such as, for example, tracking a phone location by cellular network triangulation, etc., may suffice.

Preferred emergency position-indicating radio beacons 306 relay the distress signal to satellite(s) 330 using a 406 Megahertz (MHz) signal frequency. Local responders may also use the signal during search and rescue operations. The 406 MHz frequency is a worldwide dedicated emergency frequency that is detected by a network of satellites within the Cospas-Sarsat system. Additional inform regarding this satellite system is available on the Cospas-Sarsat website URL wwww.cospas-sarsat.org.

FIG. 4 also illustrates at least one local SAR responder 327 receiving directly the emergency signal broadcast by phone recovery device 301B. In this alternate preferred arrangement, a SAR responder 327 utilizes the 406 MHz transmitting distress signal to identify the location of phone recovery device 301B. Alternately preferably, phone recovery device 301B implements a separate homing signal to assist local search and rescue efforts. For example, in one alternate preferred embodiment of the present system, a separate 121.5 MHz signal is broadcast at the same time the 406 MHz signal is activated. The 121.5 MHz signal is used by SAR responder 327 to home in on the location of phone recovery device 301.

Furthermore, alternate preferred recovery device 301C preferably comprise an additional satellite communicator module 303 structured and arranged to provide one-way outgoing short message service (SMS) capability. Satellite communicator module 303 is preferably configured to interconnect with mobile communication device 105 and transmit signals to a communication network enter operating with satellite 330 to enable the sending of custom text messages.

Like phone recovery device 101, phone recovery devices 301A, 301B, and 301C each comprise pop-out flotation bladders 310, as shown. Moreover, phone recovery devices 301A, 301B, and 301C automatically deploys and inflates pop-out flotation bladders 310 upon detecting a triggering event, preferably including the sensing of external pressures associated with submersion to pre-determined water-depth X and/or an impact force of sufficient magnitude (see again FIG. 1).

Referring again to FIG. 3, phone recovery devices 301A, 301B, and 301C each comprise at least one specialized outer case 315 to contain a respective mobile communication device. Each above-noted phone recovery device preferably further comprises at least one bladder-storage component 318, preferably two bladder-storage components 318, as shown. Each bladder-storage component 318 preferably is structured and arranged to contain pop-out flotation bladders 310 while they are in the folded/compressed and retracted positions. Phone recovery devices 301A, 301B, and 301C each comprise at least one touch-interface access region 322 to preferably provide user access to the touch screen of mobile communication device 105, as shown.

Figure 5:
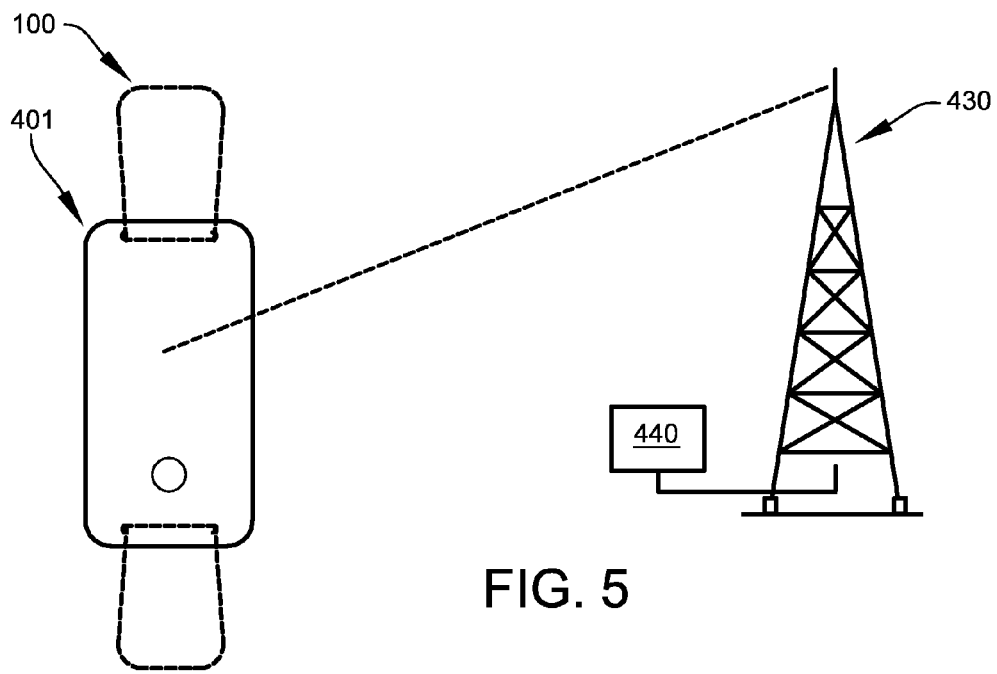
FIG. 5 shows a perspective view, illustrating a phone recovery device in communication with a cellular network to enable short-message-service (SMS) messaging, according to another preferred embodiment of the present invention.

FIG. 5 shows a perspective view, illustrating alternate preferred phone recovery device 401 in communication with at least one cellular network 430, according to another preferred embodiment of the present invention. While many of the features of phone recovery device 401 are repeated from phone recovery device 301, phone recovery device 401 preferably provides the additional feature of cooperating with the phone to permit one-way SMS messaging to be sent from phone recovery device 401 to at least one recipient 440, as shown. Such one-way SMS transmission may comprise a pre-recorded emergency message along with GPS data. Alternately preferably, phone recovery device 401 preferably provides the additional feature of permitting two-way SMS messaging to be sent from phone recovery device 401 to at least one recipient 440, as shown. It should be noted that within a cellular network, such one-way SMS transmission may be used to triangulate the location of phone recovery device 401, should GPS data not be available for transmission.

Figure 6:
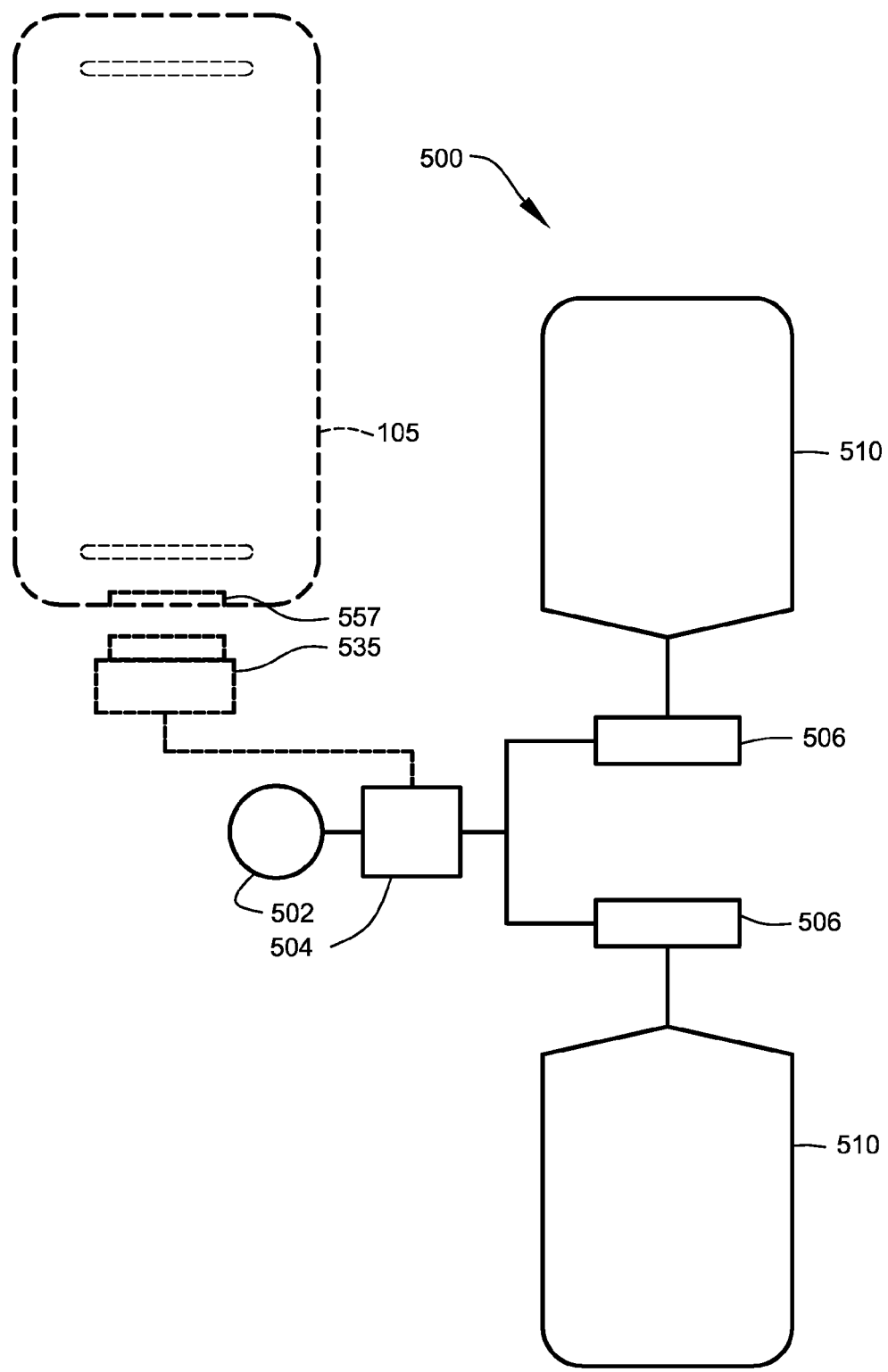
FIG. 6 shows a diagrammatic view illustrating a preferred control sub-system according to a preferred embodiment of the present invention.

FIG. 6 shows a diagrammatic view illustrating a preferred control sub-system 500 according to a preferred embodiment of the present invention.

Preferably, control sub-system 500 comprises at least one operation sensor 502, at least one controller 504, and at least one gas generation unit 506, as shown. Preferably, operation sensor 502 sends at least one signal to controller 504, which preferably initiates the operation of gas generation unit 506, or alternately preferably other gas release mechanisms, preferably when operation sensor 502 senses water and/or a pre-selected pressure change, as shown. Gas generation unit 506 preferably inflates bladders 510 using at least one gas-generating chemical reaction. In one preferred embodiment of the system, two or more chemicals are combined within a substantially-enclosed reaction chamber. The reaction chamber is preferably configured to be in pressure communication with the interior of one or more pop-out flotation bladders 510, as shown. In more specific terms, at least one first reactant and at least one second reactant are preferably stored separately within the apparatus. The reactants are preferably selected for their ability to produce the required inflation gas when combined. Gas generation unit 506 preferably comprises at least one reactor configured to combine the first reactant and second reactant once an appropriate trigger condition has been met. In preferred embodiments of the present system the reactor is controlled by the inflation initiator sub-system. At least one gas-communicative pathway preferably links the reactor(s) with pop-out flotation bladders 510, as shown. Gas generation unit 506 is preferably configured to maintain separation of the reactants until gas generation is required (at least embodying herein wherein such at least one reactor comprises at least one reactant separator structured and arranged to separate such at least one first reactant and such at least one second reactant until such production of the at least one inflation gas is required).

It is noted that preferred embodiments of control sub-system 500 may comprise one or more docking connectors 535 preferably configured to operably connect to at least one docking ports 557 of mobile communication device 105. In this alternate preferred configuration, control sub-system 500 is configured to interface with and exchange signal data with the onboard processor of mobile communication device 105. In this alternate preferred arrangement, the processor of mobile communication device 105 is transformed by interoperation with one or more system software applications to provide primary monitoring and control functions required by control sub-system 500.

Upon reading this specification, those with ordinary skill in the art will now appreciate that, under appropriate circumstances, considering such issues as design preference, user preferences, marketing preferences, cost, structural requirements, available materials, technological advances, etc., other gas release arrangements such as, for example, alternate chemically reactive gas release, etc., may suffice.

Figure 7:
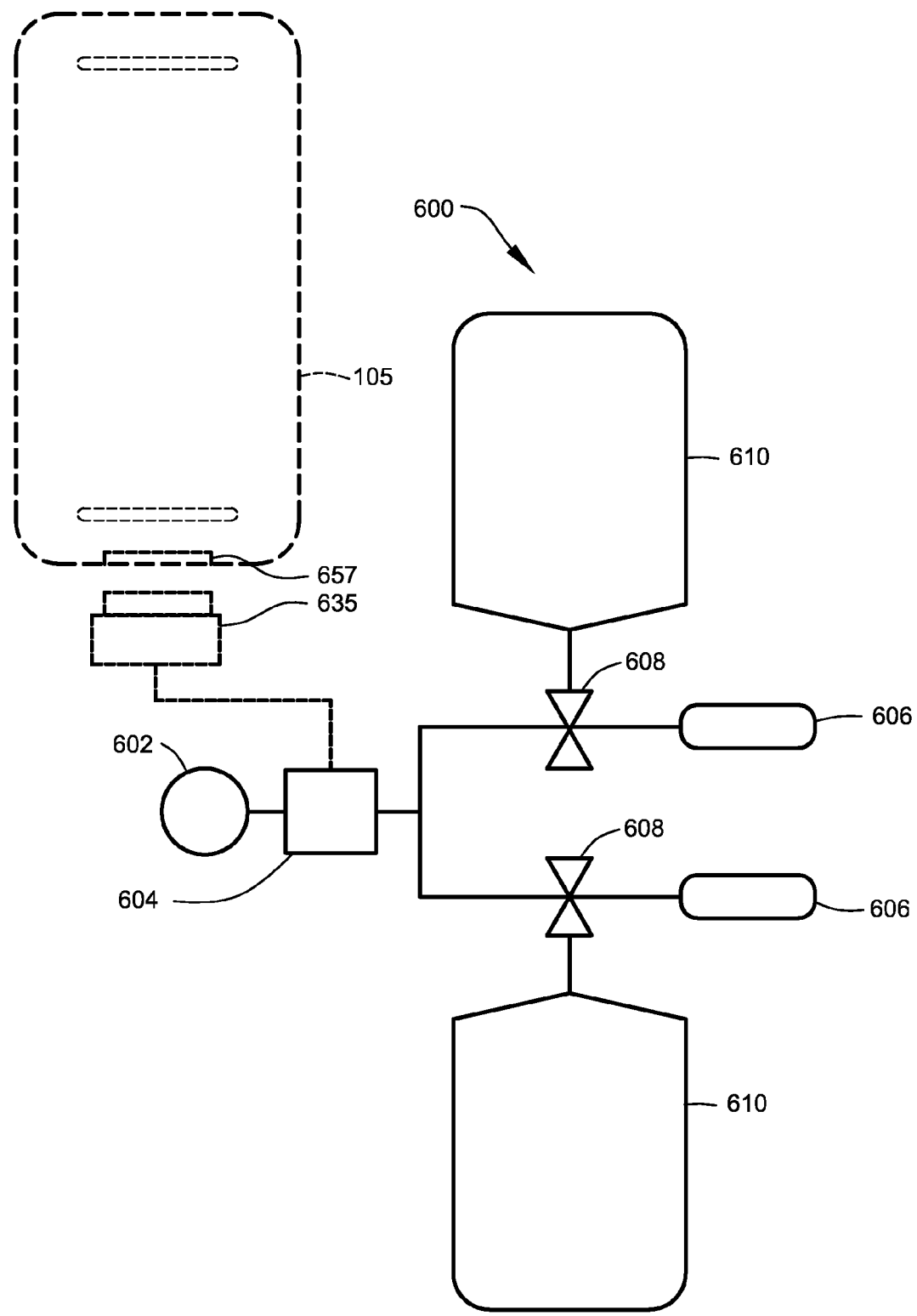
FIG. 7 shows a diagrammatic view illustrating another preferred control sub-system, according to another preferred embodiment of the present invention.

FIG. 7 shows a diagrammatic view illustrating another preferred control sub-system 600 according to another preferred embodiment of the present invention. Control sub-system 600 preferably comprises at least one operation sensor 602, at least one controller 604, at least one valve 608 and at least one gas release unit 606, as shown. Preferably, operation sensor 602 sends at least one signal to controller 604 which preferably controls valve 608 (at least embodying herein at least one valve configured to control the passage of the at least one inflation gas between such at least one gas-storage container and such at least one gas-inflatable bladder) which preferably opens and releases pre-compressed gas from gas release unit 606 (at least embodying herein at least one gas-storage container configured to store the at least one inflation gas at a pressure greater than that of the surrounding atmosphere), or alternately preferably other gas release mechanisms, preferably when operation sensor 602 senses water and/or a pre-selected pressure, as shown. Gas release control unit 606 (at least embodying herein at least one inflation initiator and at least embodying herein wherein such buoyancy modifying means comprises automatic buoyancy-modification initiating means) preferably releases gas to inflate bladders 610, through a conductor pathway, as shown and described herein. Upon reading this specification, those with ordinary skill in the art will now appreciate that, under appropriate circumstances, considering such issues as design preference, user preferences, marketing preferences, cost, structural requirements, available materials, technological advances, etc., other gas release arrangements such as, for example, chemically reactive gas release, etc., may suffice.

It is noted that preferred embodiments of control sub-system 600 may comprise one or more docking connectors 635 preferably configured to operably connect to at least one docking ports 657 of mobile communication device 105. In this alternate preferred configuration, control sub-system 600 is configured to interface with and exchange signal data with the onboard processor of mobile communication device 105. In this alternate preferred arrangement, the processor of mobile communication device 105 is transformed by interoperation with one or more system software applications to provide primary monitoring and control functions required by control sub-system 600.

Figure 8:
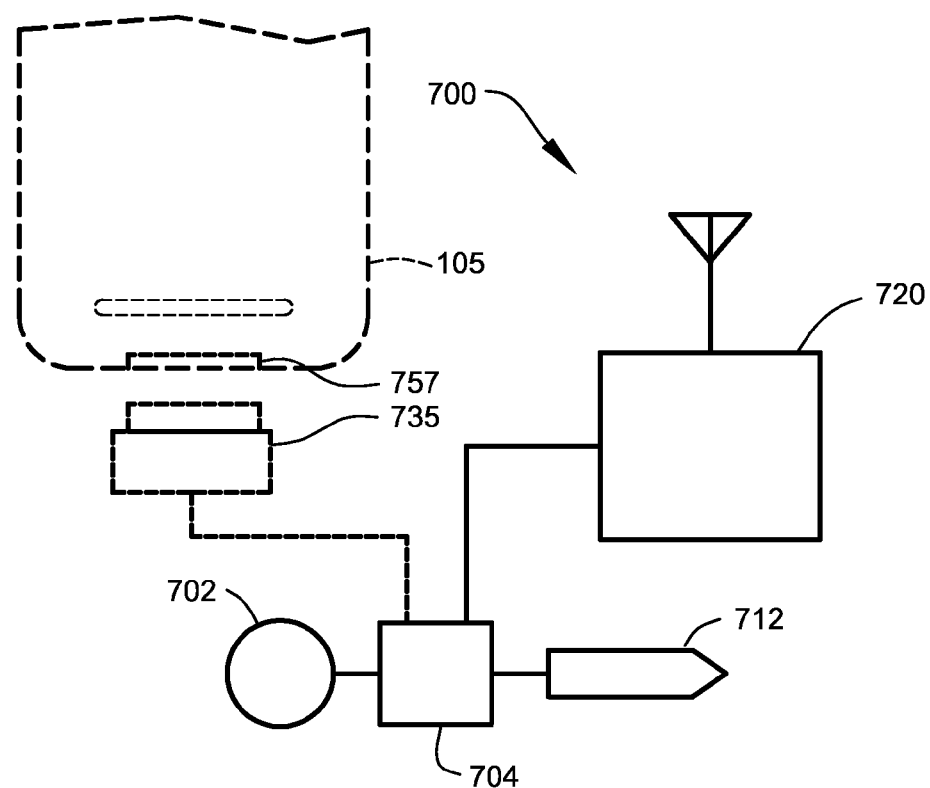
FIG. 8 shows a diagrammatic view illustrating another preferred control sub-system, according to another preferred embodiment of the present invention.

FIG. 8 shows a diagrammatic view illustrating another preferred control sub-system 700 according to another preferred embodiment of the present invention. Preferably, control system 700 controls the operation of at least one transponder/transmitter 720 incorporated within the above-described phone recovery devices 301A, 301B, and 301C. Transponder/transmitter 720 is preferably configured to broadcast signals to satellite 330 and/or SAR responder 327. In addition, control sub-system 700 comprises at least one, sensor 702 at least one coordinating controller 704, and output signal pathway 712 preferably configured to be electrically coupled with (and control the operation of) bladder inflation devices of the system embodiments, strobe features of the system embodiments, and alternately preferably other ancillary device proponents that preferably may be concurrently initiated after a "triggering event" has occurred.

It is noted that preferred embodiments of control sub-system 700 may comprise one or more docking connectors 735 preferably configured to operably connect to at least one docking port(s) 757 of mobile communication device 105. In this alternate preferred configuration, control sub-system 700 is configured to interface with and exchange signal data with the onboard processor of mobile communication device 105. In this alternate preferred arrangement, the processor of mobile communication device 105 is transformed by interoperation with one or more system software applications to provide primary monitoring and control functions required by control sub-system 700.

It is further noted that one alternate preferred embodiment of the present system fully integrates the above-described apparatus and features of the system within mobile communication device 105, as suggested by the diagrammatic illustrations of FIG. 1. This preferred alternate implementation requires a marginally larger external housing configured to hold the additional sensors, inflation subsystems, satellite-transponder components, etc., described above. Service access panels may preferably be provided to allow for inspection and replacement inflation components.

It is further noted that preferred recovery features, such as strobe light 312, may preferably be implemented by utilizing existing device hardware. For example, programming within the system-integrated device may initiate repeated "flash" illuminations of the display screen. Functions such as GPS receiving and reporting may utilize existing embedded hardware of the mobile device.

Integration of the above-described preferred functions inside a smart-phone housing represents a significant improvement to units intended to operate in marine and other remote environments. As previously noted, unmodified mobile communication devices comprise a density greater than water causing them to sink. Even at its current size (volume) the current iPhone® size is only marginally accepted by many users; thus, using an alternate means for providing positive buoyancy would make for an unacceptably large housing. Thus, Applicant's preferred ultra-thin/compact flotation system represents an important advancement in the art.

Preferably, phone recovery and rescue system 100 enables recovery of mobile communication device dropped in water of a depth preventing any radiofrequency transmission and making recovery of the device difficult. Preferred embodiments of the system contain a deployable flotation feature enabling an emergency, SOS/MAYDAY-signal transmission indicating GPS position via satellite link and/or cellular network in addition to strobe One alternate preferred embodiment of Applicant's outer shell preferably contains the above-described flotation feature and above-described beacon preferably combined with at least one satellite communicator module, preferably providing at least one-way Short Message Service (SMS) communication capability (text messaging), more preferably providing two-way SMS communication capability. Upon reading this specification, those with ordinary skill in the art will now appreciate that, under appropriate circumstances, considering such issues as design preference, user preferences, marketing preferences, cost, technological advances, etc., other communication arrangements such as, for example, two-way sat-phone (voice) capability, etc., may suffice.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claim(s).

What is claimed is:

1. A system, relating to implementing one or more recovery-assistance features within at least one mobile communicator, said system comprising:
   a) at least one buoyancy modifier in the form of at least one flotation bladder configured to modify the effective buoyancy of the at least one mobile communicator;
   b) at least one integrator configured to integrate said at least one buoyancy modifier with the at least one mobile communicator;
   c) wherein said at least one buoyancy modifier comprises
      i) at least one stowed configuration comprising at least one first buoyancy state, and
      ii) at least one deployed configuration comprising at least one second buoyancy state;
   d) wherein said at least one buoyancy modifier is configured to be compactly stowable adjacent the at least one mobile communicator when said at least one buoyancy modifier comprises said at least one first buoyancy state;
   e) wherein said at least one buoyancy modifier is configured to impart to the at least one mobile communicator an effective density less than that of at least one aqueous liquid when said at least one buoyancy modifier is integrated with the at least one mobile communicator and said at least one buoyancy modifier comprises said at least one second buoyancy state; and
   f) wherein said at least one buoyancy modifier comprises at least one gas-inflatable bladder and at least one automatic buoyancy-modification initiator configured to automatically initiate transition of said at least one first buoyancy state to said at least one second buoyancy state when at least one pre-defined condition is met, wherein said at least one automatic buoyancy-modification initiator comprises a gas provider configured to provide at least one inflation gas to said at least one gas-inflatable bladder.

2. The system according to claim 1 wherein
said at least one gas-inflatable bladder is configured to contain at least one inflation gas;
and
wherein said at least one automatic buoyancy-modification initiator comprises at least one inflation initiator configured to initiate the providing of the at least one inflation gas to said at least one gas-inflatable bladder when such at least one pre-defined condition is met.

3. The system according to claim 2 wherein:
   a) said at least one first buoyancy state correlates with at least one decreased displacement volume of said at least one gas-inflatable bladder prior to inflation; and
   b) said at least one second buoyancy state correlates with at least one increased displacement volume of said at least one gas-inflatable bladder when inflated with the at least one inflation gas.

4. The system according to claim 2 wherein said at least one gas provider comprises:
   a) at least one first reactant and at least one second reactant configured to produce the at least one inflation gas when combined;
   b) at least one reactor configured to react said at least one first reactant and said at least one second reactant; and
   c) and at least one gas-communicative pathway linking said at least one reactor with said at least one gas-inflatable bladder;
   d) wherein production of at least one inflation gas by said at least one reactor is controlled by said at least one inflation initiator; and
   e) wherein said at least one reactor comprises at least one reactant separator structured and arranged to separate said at least one first reactant and said at least one second reactant until such production of the at least one inflation gas is required.

5. The system according to claim 2 wherein said at least one gas provider comprises:
   a) at least one gas-storage container configured to store the at least one inflation gas at a pressure greater than that of the surrounding atmosphere;
   b) at and at least one gas-communicative pathway linking said at least one reactor with said at least one gas-inflatable bladder; and c) at least one valve configured to control the passage of the at least one inflation gas between said at least one gas-storage container and said at least one gas-inflatable bladder;

d) wherein operation of said at least one valve is controlled by said at least one inflation initiator.

6. The system according to claim 2 further comprising:

a) at least one sensor configured to sense the presence of at least one environmental factor associated with said at least one pre-defined condition;

b) wherein said at least one automatic buoyancy-modification initiator is configured to receive sensor data from said at least one sensor.

7. The system according to claim 6 wherein said at least one sensor comprises at least one liquid sensor configured to sense the presence of the at least one aqueous liquid adjacent the at least one mobile communicator.

8. The system according to claim 6 wherein:

a) said at least one sensor comprises at least one pressure b) sensor configured to sense atmospheric pressure adjacent the at least one mobile communicator; and said at least one automatic buoyancy-modification initiator is configured to automatically initiate such transition to said at least one second buoyancy state when said at least one pre-defined condition comprises an increase in ambient pressure.

9. The system according to claim 6 wherein:

a) said least one sensor comprises at least one acceleration sensor configured to sense acceleration loading experienced by the at least one mobile communicator; and b) said at least one automatic buoyancy-modification initiator is configured to automatically initiate such transition to said at least one second buoyancy state when said at least one pre-defined condition comprises a detected acceleration load above a selected threshold.

10. The system according to claim 2 further comprising at least one illuminator configured to provide illumination assisting location and retrieval of the at least one mobile communicator.

11. The system according to claim 2 further comprising at least one emergency position-indicating radio beacon configured to transmit at least one detectable emergency radio-frequency signal.

12. The system according to claim 11 wherein said least one emergency position-indicating radio beacon comprises at least one onboard Global Positioning System (GPS) receiver.

13. The system according to claim 11 wherein said at least one integrator further comprises:

a) at least one docking connector configured to operably couple to at least one docking port of the at least one mobile communicator;

b) wherein such operable coupling enables interoperation between the at least one mobile communicator and one or more features of said system.

14. The system according to claim 13 wherein said system is structured and arranged to utilize at least one human interface feature of the at least one mobile communicator.

15. The system according to claim 11 further comprising at least one short-message-service (SMS) transmitter configured to transmit SMS-based communications.

16. The system according to claim 11 further comprising at least one short-message-service (SMS) transmitter/receiver configured to transmit and receive SMS-based communications.

17. The system according to claim 11 wherein said at least one integrator comprises:

a) at least one outer case configured to at partially house the at least one mobile communicator;

b) wherein said at least one outer case is removably attachable to the at least one mobile communicator.

18. A system, relating to implementing one or more recovery-assistance features within at least one mobile communicator, said system comprising:

a) at least one buoyancy modifier in the form of at least one flotation bladder, comprising at least one gas-inflatable bladder, configured to modify the effective buoyancy of the at least one mobile communicator;

b) at least one integrator configured to integrate said at least one buoyancy modifier with the at least one mobile communicator;

c) wherein said at least one gas-inflatable bladder comprises
 i) at least one stowed configuration comprising at least one first buoyancy state, and
 ii) at least one deployed configuration comprising at least one second buoyancy state;

d) wherein said at least one gas-inflatable bladder is configured to be compactly stowable adjacent the at least one mobile communicator when said at least one gas-inflatable bladder comprises said at least one first buoyancy state;

e) wherein said at least one gas-inflatable bladder is configured to impart to the at least one mobile communicator an effective density less than that of at least one aqueous liquid when said at least one gas-inflatable bladder is integrated with the at least one mobile communicator and said at least one gas-inflatable bladder comprises said at least one second buoyancy state;

f) wherein said at least one buoyancy modifier comprises at least one gas-inflatable bladder and at least one automatic buoyancy-modification initiator configured to automatically initiate transition of said at least one gas-inflatable bladder from said at least one first buoyancy state to said at least one second buoyancy state when at least one pre-defined condition is met;

g) wherein said at least one buoyancy modifier further comprises, operably coupled with said at least one gas-inflatable bladder, at least one gas provider configured to provide the at least one inflation gas to said at least one gas-inflatable bladder; and h) wherein said at least one automatic buoyancy-modification initiator comprises
 i) at least one sensor configured to sense the presence of at least one environmental factor associated with said at least one pre-defined condition, and
 ii) at least one inflation initiator configured to initiate the providing of the at least one inflation gas to said at least one gas-inflatable bladder when such at least one pre-defined condition is met.

19. The system according to claim 18 wherein said at least one integrator comprises:

a) at least one outer case configured to at partially house the at least one mobile communicator;

b) wherein said at least one outer case is removably attachable to the at least one mobile communicator.

20. A system, relating to implementing one or more recovery assistance features within at least one mobile communicator, said system comprising:

a) buoyancy modifying means in the form of at least one flotation bladder for modifying the effective buoyancy of the at least one mobile communicator;

b) integrating means for integrating said buoyancy modifying means with the at least one mobile communicator;
c) wherein said buoyancy modifying means comprises
   i) at least one stowed configuration comprising at least one first buoyancy state, and
   ii) at least one deployed configuration comprising at least one second buoyancy state;
d) wherein said buoyancy modifying means is configured to impart, to the at least one mobile communicator, an effective density less than that of at least one aqueous liquid when said buoyancy modifying means is integrated with the at least one mobile communicator and said buoyancy modifying means comprises said at least one second buoyancy state; and
e) wherein said buoyancy modifying means comprises at least one gas-inflatable bladder and at least one automatic buoyancy-modification initiating means for initiating transition of said buoyancy modifying means form said at least one first buoyancy state to said at least one second buoyancy state when at least one pre-defined condition is met wherein said at least one automatic buoyancy-modification initiator comprises a gas provider configured to provide at least one inflation gas to said at least one gas-inflatable bladder.

* * * * *